INVENTOR.
RALPH H. SCHUMAN
BY Hudson, Boughton,
Williams, David & Hoffmann
ATTORNEYS

United States Patent Office 2,908,252
Patented Oct. 13, 1959

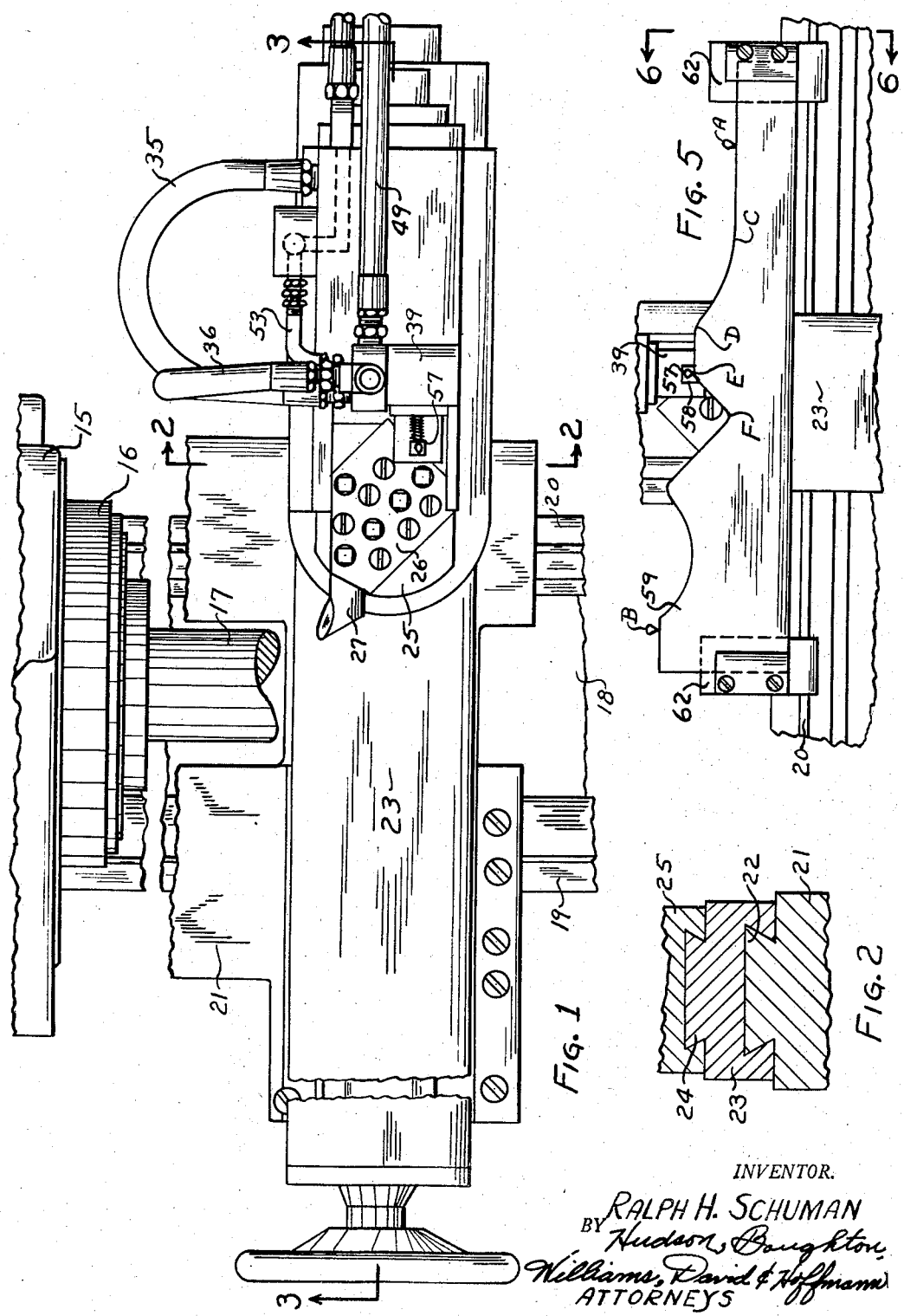

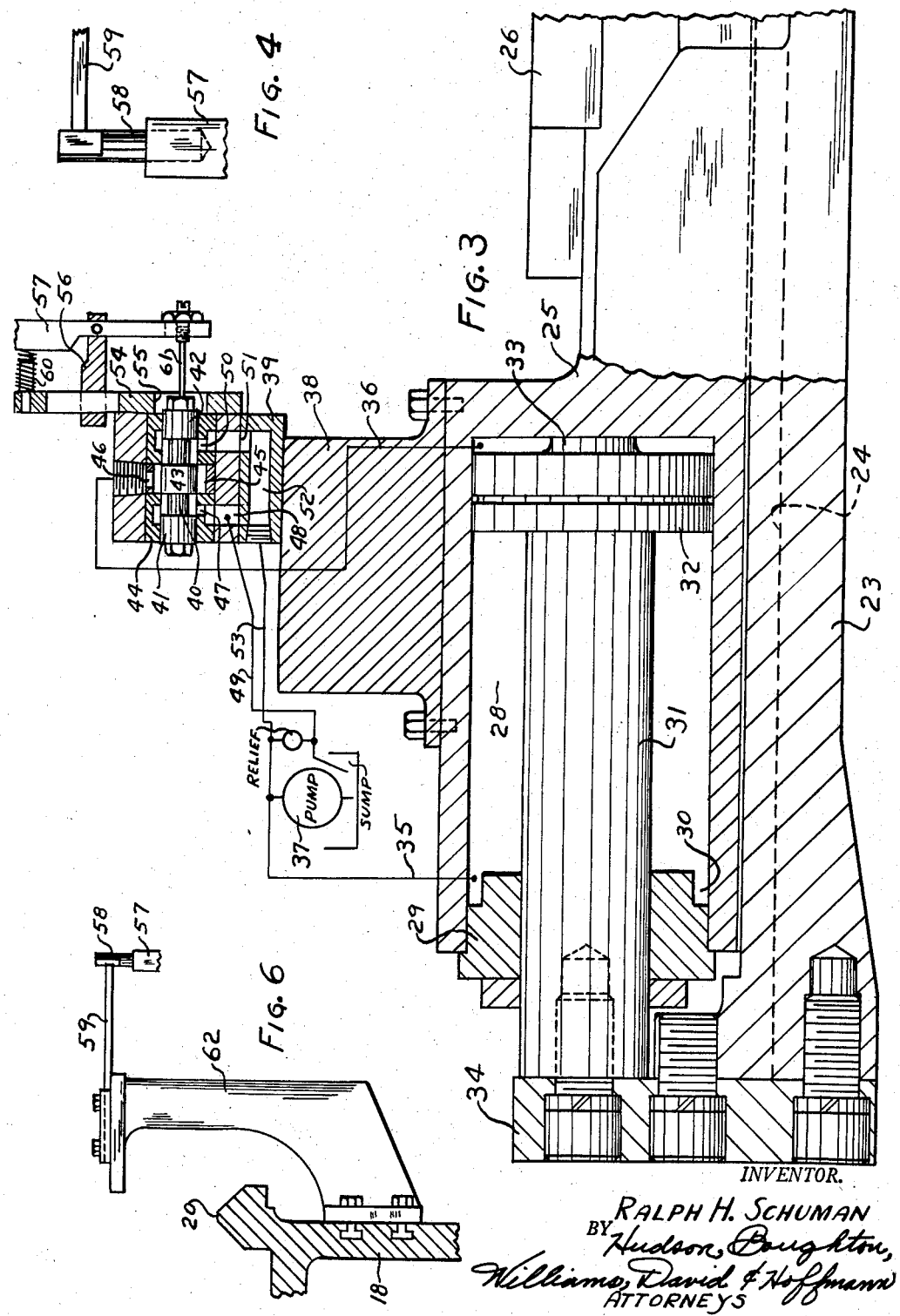

2,908,252
CONTOUR FOLLOWER APPARATUS

Ralph H. Schuman, Cleveland, Ohio, assignor to The Warner & Swasey Company, Cleveland, Ohio, a corporation of Ohio Application July 26, 1954, Serial No. 445,507

4 Claims. (Cl. 121—41)

This invention relates to a contour follower apparatus for machining work pieces to have a configuration corresponding to the configuration of a pattern or template.

The apparatus embodying the invention may be included in various types of machine tools, but for purposes of illustration it will be illustrated and described herein as embodied in a machine tool of the lathe type.

An object of the invention is to provide an improved contour follower apparatus which is highly sensitive in its action, is accurate and efficient and which provides for machining the work piece with a configuration accurately corresponding to the configuration of the pattern or template.

Another object of the invention is to provide an improved contour follower apparatus wherein a novel electric-pressure fluid control mechanism is employed which renders the apparatus more sensitive, accurate and efficient and provides for machining the work piece with the exact configuration of the template or pattern.

Another object is to provide a contour follower apparatus as referred to in the last mentioned object, and wherein the velocity of movement of the slide mounting the contour cutting tool together with the movement and position of the control valve of the control mechanism act through certain electrical devices of the electric-pressure fluid control mechanism to assure accurate correlation between slide movement and position and the movement of the follower by the template to obtain the machining of the work piece in accurate conformance with the contour of the template.

A further object is to provide a contour follower apparatus as referred to in the last two objects and wherein any quick or sudden movement of the follower by the template which produces a sudden large opening in the main control valve resulting in quick movement of the slide acts through an electrical feed back system included in the control mechanism to modulate the effect on the control mechanism of such quick or sudden movement of the follower.

A further object is to provide a contour follower apparatus wherein fast or sudden movements of the contour cutting tool slide act through an electrical feed back system in the electric-pressure fluid control mechanism to prevent coasting or overrunning of said slide to thus assure that the depth of tool cut will be accurately correlated to the contour of the template or pattern.

Further and additional objects and advantages not hereinbefore specified will become apparent hereinafter during the detailed description of embodiments of the invention which is to follow and which embodiments are illustrated in the accompanying drawings forming part of this specification and wherein, Fig. 1 is a fragmentary plan view of a machine tool embodying the invention.

Fig. 2 is a detail sectional view taken substantially on line 2—2 of Fig. 1 looking in the direction of the arrows.

Fig. 3 is a section taken substantially on irregular line 3—3 of Fig. 1 looking in the direction of the arrows.

Fig. 4 is a fragmentary elevational view of the upper end of the pivoted follower or stylus shown in Fig. 3 and a portion of the template which cooperates therewith.

Fig. 5 is a plan view of the rear portion of the machine showing the contour slide and the follower carried thereby and cooperating with the template which is shown mounted on brackets connected to the rear part of the bed of the machine.

Fig. 6 is a vertical sectional view taken substantially on line 6—6 of Fig. 5 looking in the direction of the arrows.

Figure 7:
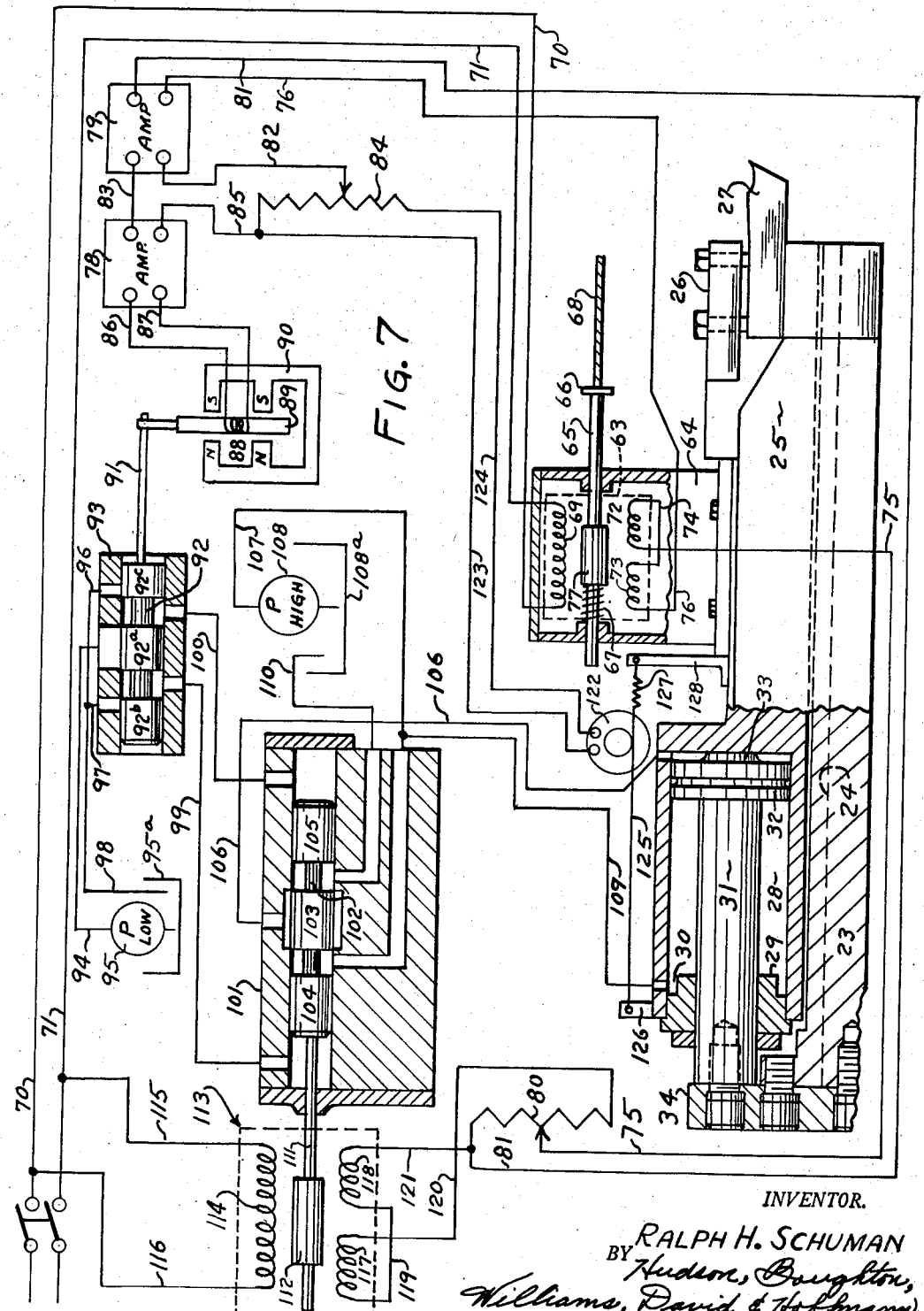
Fig. 7 is a view similar to Fig. 3 but illustrates a different embodiment of the invention and one wherein a novel electric-pressure fluid control mechanism is employed.

Referring to Fig. 1, the machine tool shown therein and in which an apparatus embodying the invention is incorporated is for illustrative purposes a lathe, but it will be understood that the invention may be embodied in other types of machine tools.

The lathe shown in Fig. 1 includes the usual headstock 15 mounting a rotatable work spindle 16 in which a work piece indicated at 17 may be chucked. The machine tool further comprises a bed 18 provided with parallel front and rear ways 19 and 20 which extend longitudinally of the bed in parallelism to the axis of the work spindle. The usual carriage indicated at 21 is slidable on said ways toward and from the headstock and on the front of the machine has secured thereto an apron through which a feed shaft extends which is operatively connected to the work spindle and feeding mechanism for the carriage, so that the carriage can be moved or fed longitudinally of the bed in timed relation to the rotation of the work spindle, all as is well understood in the art.

The carriage 21 on its upper surface is provided with a dovetail way 22 that extends perpendicularly transversely to the front and rear ways 19 and 20 of the bed and on which dovetail way a cross slide 23 is slidably mounted. The cross slide 23 may be moved on the carriage transversely of the bed either manually or by a feed mechanism operatively connected with the feed shaft previously referred to as will be well understood in the art.

Also, in view of the incorporation into the machine tool of the contour follower apparatus embodying the present invention, the cross slide will be provided with means for adjusting the same relative to the carriage and then clamping it in adjusted position, such arrangement also being well known in the art.

The carriage 21 and cross slide 23 extend rearwardly beyond the rear way 20 of the bed and the cross slide 23 on its upper surface is provided with a dovetail way 24 adjacent the rear portion of the cross slide and on which way is slidably mounted a contour slide 25. The contour slide 25 at its end which is adjacent to the rear way 20 has a tool holder portion 26 on its upper side in which may be mounted a contour cutting tool 27. Although the contour slide is shown for illustrative purposes as moving perpendicularly to the path of movement of the carriage it may be mounted for movement at any desired angle thereto.

The contour slide 25 rearwardly of the end thereof mounting the cutting tool 27 has a portion provided interiorly with a bore forming a cylinder 28. The bore or cylinder 28 is dead-ended at one end, i.e., the right hand end as indicated in Fig. 3, and is closed at its opposite end by a closure plug 29, the inner end of which is of reduced diameter to provide an annular space 30 between the wall of the bore 28 and the reduced end of the plug 29 for a purpose later to be explained.

The plug 29 is provided with a central opening through which extends a piston rod 31 for relative sliding movement and said rod is provided at its inner end with a piston head 32 relatively slidable in the bore 28 and which may be provided with a suitable piston ring if desired. The piston head 32 on its side adjacent to the dead-end of the bore 28 is provided with an abutment boss 33 adapted to engage the dead-end of the bore 28 at the end of a piston stroke so as to provide a space between the dead-end of the bore and the piston head. The piston rod 31 is secured to an anchor plate or bracket 34 which in turn is secured to the end of the cross slide 23, wherefore it will be seen that the piston rod 31 and piston head 32 are stationary while the slide 25 moves relative thereto.

The movement of the contour slide 25 on the cross slide 23 is effected by pressure fluid, it being noted that the space 30 in the cylinder or bore 28 is connected to a pressure-fluid conduit 35 while the dead-end of the cylinder 28 is connected to a pressure fluid conduit 36. The conduit 35 is directly connected to the output side of a pump 37, wherefore the chamber in the cylinder 28 between the plug 29 and that side of the piston head 32 of small projected pressure area is always subject to full pump pressure.

The conduit 36 extends to a control valve now to be described. A supporting block 38 is secured to or integral with the upper side of the contour slide and mounts a housing 39 for the main control valve. The main control valve comprises an axially shiftable valve body 40 provided with end lands 41 and 42 and a middle or intermediate land 43. The lands 41, 42 and 43 are slidable in the valve bore of a valve casing 44 mounted in the valve housing 39, said casing being formed of separate elements pressed into a bore in the valve housing from opposite ends thereof, with the inner ends of said elements spaced apart by a spacer sleeve 45.

The conduit 36 previously referred to is connected with a port 46 in the valve housing 39 and sleeve 45 and which port communicates with the space between the separate elements forming the valve casing 44. The valve casing 44 is provided with a port 47 that communicates with a passage 48 in the valve housing 39 and said passage, in turn, is connected to a conduit 49 that extends to the sump of the pump 37.

The valve casing 44 is also provided with a port 50 that communicates with passages 51 and 52 in the valve housing 39, with said passages, in turn, being connected to a conduit 53 that extends to the output side of the pump 37. It will be seen that in the central position of the valve body 40 shown in Fig. 3, the chamber in the bore 28 formed by the large projected pressure area side of the piston head 32 and the dead end of the bore is not subject to pump pressure and is not connected to drain since the port 46 in the control valve is closed by the central land 43.

It will be seen that when the valve body 40 is shifted from its central position shown in Fig. 3 toward the left then the passage 51 in the valve housing 39 which is connected to the pump pressure side of the circuit is connected through the port 50 with the port 46 and hence with the conduit 36. Consequently the large pressure area side of the piston head 32 is now subject to pump pressure as well as the small pressure area side thereof which is always so subject, and hence, due to the differential in pressure areas, the contour slide 25 will move relative to the piston head 32 toward the right as viewed in Fig. 3 which is the forward direction of the slide, it being understood that the pressure fluid on the small area side of the piston head 32 during such movement is circulated back into the pressure line.

When the valve body 40 is shifted from its central position shown in Fig. 3 toward the right then the conduit 36 is connected through the port 46 with the port 47 and passage 48 and hence with the drain conduit 49 and therefore the large pressure area side of the piston head 32 is now connected to drain whereupon the pressure fluid on the small area side of the piston head functions to move the slide 25 rearwardly or toward the left as viewed in Fig. 3 until the boss 33 abuts the dead end of the bore 28. Then when the valve body 40 is shifted from its right hand shifted position just referred to back to its central position as indicated in Fig. 3, it will be seen that the conduit 36 is closed while the pressure is still acting on the small pressure area side of the piston and functions to maintain the boss 33 in contact with the dead end of the bore 28 with the slide in its most rearward position, wherefore the slide remains in said position.

The shifting of the valve body 40 from its central position to the left or to the right as the case may be is produced by a follower mechanism now to be described. A supporting plate 54 is secured to the right hand side of the valve housing 39, as viewed in Fig. 3, and is provided with an opening 55 to accommodate movement of the land 42 of the valve body. The supporting plate 54 has clamped to it a bracket arm 56 which adjacent its free end has pivotally connected to it on a horizontal axis a follower arm 57, the point of the pivotal connection between the bracket arm 56 and follower arm 57 being intermediate the ends of the follower arm.

The upper end of the follower arm 57 mounts a stylus or follower 58 adapted to cooperate with a template 59 secured to the bed of the machine tool as will later be described. The follower arm 57 is normally urged in a direction to engage the stylus or follower 58 with the template 59 by means of a coil spring 60 mounted on a pin carried by the supporting arm 54 and abutting said supporting arm and the follower arm 57.

The lower end of the follower arm 57 has connected to it a flexible link or rod 61 which, in turn, is connected to the end of the valve body 40 adjacent to the land 42. The template or pattern 59 is secured to the upper ends of a pair of upstanding bracket arms 62, the lower ends of which are secured to the bed 18 below the rear way 20 and on opposite sides of the cross slide 23 so the cross slide and carriage can move longitudinally of the bed between the brackets at least the complete length of the template. The bracket arm 62 may be adjusted longitudinally of the bed by having its lower ends clamped to the bed by means of T-head bolts engaging in T-slots formed in the bed as shown in Fig. 6.

The embodiment of the invention heretofore described operates in the following manner: It may be assumed that a template of the desired configuration is secured to the upper end of the bracket arms 62 and that a suitable work piece is chucked in the work spindle 16 and that the carriage is in its rearward position while the cross slide 23 has been adjusted and clamped in adjusted position on the carriage. It will also be assumed that the contour slide 25 is in a position such that the stylus or follower 58 is engaging the template 59 at the starting point on the template indicated in Fig. 5 as position A. This means that the follower arm 57 is in vertical position shown in Fig. 3 while the valve body 40 is in its central position. The operator now starts the feeding movement of the carriage and as the carriage moves longitudinally of the bed toward the headstock the follower or stylus 58 follows the edge of the template with the result that the follower arm 57 is rocked in opposite directions according to the contour of the template edge. This rocking of the follower arm 57 in opposite directions shifts the valve body 40 either to the right or to the left to cause forward or rearward movement of the contour slide 25 relative to the work piece so that the contour cutting tool 27 will machine the work piece in accordance with the configuration of the template or pattern.

When the carriage has moved sufficiently to bring the stylus or follower 58 into engagement with the template at position B the feeding movement of the carriage ceases. The operator may now move the follower manually out of contact with the template and against the action of the spring 60 which shifts the valve body 40 toward the right as viewed in Fig. 3, whereupon the contour slide 25 will move rearwardly on the cross slide to its most rearward position and while the follower is thus held by the operator the latter can cause the carriage to move rearwardly to its starting position, whereupon the operator can release the follower and the spring 60 will rock the follower in a direction to shift the valve body 40 toward the left whereupon the contour slide will move forwardly on the cross slide until the stylus or follower 58 engages the template or pattern at point A so the follower is in vertical position and the valve body 40 in its intermediate position, whereupon the forward movement of the contour slide 25 ceases. The operator may now unchuck the finished work piece, chuck a new work piece and start the feeding movement of the carriage to contour machine the new work piece in the manner previously described.

The description of the embodiment of the invention shown in Fig. 7 will now be set forth. It will be understood that this form of the invention is embodied in a machine tool such as the lathe described in connection with the previous form. Insofar as the carriage, cross slide, contour slide and pressure fluid motor for moving the slide are concerned the construction is the same as in the previously described form and hence need not be repeated and the parts will be identified by the same reference characters previously used for the same parts in the preceding form.

In the embodiment shown in Fig. 7 an electrical sensing device indicated generally at 63 is secured upon a supporting portion 64 of the contour slide 25 and which is illustrated as bolted to the top of said slide 25, although, of course, it might be formed integral with the slide. The sensing device 63 includes a slidable follower rod 65 provided with a template contact portion 66. A spring 67 on the rod 65 tends to move said rod in a template engaging direction, the template being indicated at 68, it being understood that said template is similarly supported and may be of the same or a modified form from the template 59 shown in Figs. 5 and 6.

The sensing device 63 may take various forms but is here illustrated and described as in the form of a differential transformer wherein the primary coil of the transformer indicated at 69 is connected by leads 70 and 71 to a suitable source of A.C. electrical energy such as the usual commercial current and controlled by a suitable switch as will be understood.

The secondary coil or winding of the differential transformer 63 is in the form of two coils 72 and 73 connected in opposition. The outer end of the coil 72 is connected by wire 74 with the inner end of the coil 73 while the inner end of the coil 72 is connected to a wire 75 and the outer end of the coil 73 to a wire 76.

The differential transformer 63 also includes an endwise shiftable core 77 which is movably mounted between the primary coil 69 and the secondary coils 72 and 73 and is carried by and fixed to the follower rod 65. When the core 77 is in its mid position the induced voltages in the opposing secondary coils 72 and 73 cancel each other and hence no voltage appears between the wires 75 and 76.

When the core 77 is endwise shifted with the follower rod 65 so the greater part of the core lies between the primary coil 69 and the secondary coil 72 then the induced voltage between wire 75 and wire 76 is in one phase and the magnitude of such voltage is proportional to the amount of the core that is between the primary coil 69 and the secondary coil 72, compared to the amount of the core that is between the primary coil 69 and the secondary coil 73.

It will be understood that if the core 77 is displaced in the opposite direction with the follower rod 65 so as to be located between the primary coil 69 and the secondary coil 73 or to have the greater portion of it so located therebetween then the induced voltage will be of the opposite phase and the magnitude of such voltage is proportional to the amount of the core 77 that is between the primary coil 69 and the secondary coil 73 as compared to the amount of the core that is between the primary coil 69 and the secondary coil 72.

It will thus be seen that with the core 77 in its intermediate position with equal amounts thereof located between the primary coil 69 and each of the secondary coils 72 and 73 that no voltage will appear between the wires 75 and 76, but displacement of the core 77 from said central position in one direction or the other by the engagement between the template 68 and the contact portion 66 will cause an induced voltage to appear between the wires 75 and 76 of a value between zero and maximum and of a phase depending upon the direction of displacement of the core 77.

It will be kept in mind that the movement of the follower rod 65 during the feeding operation and the machining of the work piece is controlled by the contour of the template with which it engages.

It may be assumed that the wire 76 from the secondary coil 73 of the sensing device or differential transformer 63 is directly connected to one input terminal of a suitable phase detecting amplifying unit 79 of any well known commercial form while the wire 75 from the secondary coil 72 of the differential transformer 63 is connected through an adjustable potentiometer 80 with the wire 81 that is connected to the other input terminal of the amplifying device 79.

One output terminal of the phase detecting amplifying device 79 is connected by a wire 83 to one input terminal of a direct current amplifying device 78, and the other output terminal of the phase detecting amplifying device 79 is connected by a wire 82 to a potentiometer 84 which has one end of its resistance coil connected to a wire 85 that is connected to the other input terminal of the direct current amplifying device 78.

The output side of the amplifying device 78 is connected by wires 86 and 87 to a coil 88 on the pivoted armature 89 of a torque motor having a permanent magnet 90 in the form providing U-shaped pole pieces, one of which is the north pole and the other the south pole.

It will be understood that as current is flowing from the amplifier 78 through the wires 86 and 87 in one direction then the armature 89 of the torque motor will tend to rotate in one direction while if the current is flowing from the amplifier 78 through the wires 86 and 87 in the opposite direction the armature 89 will tend to rotate in the opposite direction from that first referred to and these tendencies will be proportional to the magnitude of the respective currents as will be well understood in the art.

The rockable armature 89 of the torque motor at one end i.e., its upper end as viewed in Fig. 7, has an extended portion, the outer end of which is connected to one end of a flexure link 91 with the other end of said link being connected to a slidable valve piston 92 forming part of a pilot valve and including valve housing 93 in which the valve piston 92 is slidable. The valve piston 92 is provided with an intermediate or central land 92a and two end lands 92b and 92c. The bore in the valve housing 93 in which the valve piston 92 is endwise movable is connected midway of its ends to a pressure fluid conduit 94 that extends to the output side of a pilot pump 95. It will be seen that said conduit 94 is obstructed by the intermediate land 92a of the valve piston 92 when said valve piston is in its intermediate or central position.

The bore in the pilot valve housing 93 adjacent its opposite ends is connected by conduits 96 and 97 to a drain conduit 98 that extends to the sump 95a of the pump 95. It will be seen that when the valve piston 92 is in its intermediate or central position in the valve housing 93 the end lands 92b and 92c obstruct, respectively, the conduits 97 and 96.

The bore or valve chamber in the pilot valve housing 93 intermediate the lands 92a and 92b and 92a and 92c is connected to conduits 99 and 100 which extend, respectively, to the opposite ends of a main control valve housing 101.

A shiftable main control valve piston 102 is slidably mounted in the bore or chamber of the main control valve housing 101 and has a central or intermediate land 103 and end lands 104 and 105, it being noted that said valve piston has its opposite ends terminating short of the ends of the valve chamber so as to provide two end chambers with which the conduits 99 and 100 communicate respectively.

The valve chamber in the housing 101 of the main control valve communicates midway of its ends with a conduit 106 that extends to the dead end of the bore 28 in the contour slide 25 and which conduit is obstructed by the intermediate land 103 of the valve piston 102 when said valve piston is in its central or intermediate position.

The valve chamber in the main control valve housing 101 when the valve piston 102 is in its central or intermediate position communicates intermediate the lands 103 and 104 with a conduit 107 that extends to the output side of a power pump 108, said output side of said pump 108 also being connected at all times by a conduit 109 with the annular space 30 between the reduced inner end of the plug 29 and the wall of the bore 28 of the contour slide 25.

The main control valve housing 101 has its valve chamber connected when the valve piston 102 is in its central or intermediate position and intermediate the lands 103 and 105 with a conduit 110 that extends to the sump 108a of the pump 108.

The valve piston 102 of the main control valve has its end at which the land 104 is located connected to a slidable rod 111 that has fixed to it the core 112 of a valve position sensing device which may be in the form of a differential transformer identical in construction with the electrical sensing device 63 previously described.

The differential transformer or valve position sensing device containing the core 112 is indicated generally at 113 and its primary coil 114 has its opposite ends connected by wires 115 and 116 to the wires 70 and 71 of the A.C. supply used for the sensing device 63. The differential transformer 113 includes secondary coils 117 and 118 which have one of their ends interconnected by a wire 119. The other end of the secondary coil 117 is connected by wire 120 to one end of the resistance coil of the potentiometer 80. The other end of the secondary coil 118 of the differential transformer 113 is connected by wire 121 to the opposite end of the resistance coil of the potentiometer 80 and to the wire 81 previously referred to.

It will be seen that as the valve piston 102 is endwise shifted the core 112 of the differential transformer 113 is endwise shifted through the rod 111 and this induces a voltage across the potentiometer 80, the magnitude and phase of which depends upon the position of the core 112 as explained with respect to the differential transformer 63.

As previously explained, the wire 75 is connected to one end of the secondary coil 72 of the differential transformer 63. The position at which said wire 75 is connected to potentiometer 80 determines what fraction of the induced voltage of the sensing device 113 is added to or subtracted from the induced voltage of the sensing device 63. These voltages add when in the same phase and subtract when in opposite phase. The resultant voltage is then applied to the input of the phase detecting amplifying unit 79 by means of wires 76 and 81. The direct current voltage output of the amplifying unit 79 across wires 82 and 83 will have a polarity dependent upon the phase of the input to the amplifying device 79 and of a magnitude proportional to the input voltage.

The velocity sensing device indicated at 122 and which may be in the form of a D.C. tachometer commercially obtainable is suitably supported by the cross slide and has its terminals connected by wires 123 and 124 to the opposite ends of the resistance coil of the potentiometer 84. It will be understood that actuation of the tachometer 122 produces a direct current voltage proportional to the velocity of the tachometer and of a polarity dependent upon the direction of rotation of the tachometer.

The rotary element of the tachometer, i.e., the armature, is rotated in one or the other direction by a cable 125 which is wrapped around the exposed pulley of the armature of the tachometer and has one of its ends connected to a bracket 126 secured on the upper part of the contour slide 25 and its opposite end connected to one end of a coil spring 127, the opposite end of which spring is connected to a bracket 128 also secured to the upper side of the contour slide 25.

It will be seen that movement of the contour slide in either the forward or reverse direction will cause actuation of the tachometer 122 in one of the other direction and at a velocity directly proportional to the rate of movement of the slide 25.

The position at which wire 82 is connected to the potentiometer 84 determines what fraction of the tachometer voltage is added to or subtracted from the output voltage of the amplifying unit 79. The tachometer voltage is added to the output voltage of amplifying unit 79 for one direction of tachometer rotation and for one phase resultant from the two differential transformers 63 and 113 and is subtracted from the output voltage of amplifying unit 79 either if the tachometer rotation is reversed or the phase resultant from the differential transformers 63 and 113 is reversed.

In order to bring out more clearly the purpose and function of the arrangement above described the operation of the apparatus shown in Fig. 7 will now be explained. It may be assumed that the contour slide 25 is stationary at a position with respect to the template 68 so that follower 66 and rod 65 under the influence of spring 67 hold the core 77 of the differential transformer or sensing device 63 in the neutral position. It may further be assumed that power is supplied to lines 70, 71, 115 and 116. A slight movement of follower 66 to the right as viewed in Fig. 7 and as may be caused by the template 68 or external forces acting on the contour slide 25 will cause an induced voltage to appear between lines 75 and 76. However, since the contour slide 25 is initially at rest or substantially at rest the tachometer 122 is generating no voltage and the main control valve piston 102 and its sensing device 113 are in a neutral position and consequently no voltage is induced across the potentiometers. Therefore the current to the torque motor 90 and its clockwise deflection is proportional to the highly amplified voltage from the sensing device 63. This results in shifting the pilot valve piston 92 toward the right as viewed in Fig. 7, whereupon pressure fluid from conduit 94 flows to conduit 99 and to the left hand end of the main control valve 101, the right hand end of said valve now being connected to drain through conduit 100 between pilot valve lands 92a and 92c and conduits 96 and 98. The pressure fluid acting on the left hand end of valve piston 102 of the main control valve shifts said piston toward the right with a similar shifting of the core 112 of the differential transformer 113. Thereupon the differential transformer 113 induces a voltage across potentiometer 80 opposite in phase to the voltage produced by the differential transformer 63. This oppositely phased voltage induced by the differential transformer 113 is subtracted from the voltage induced by the transformer 63 from the input to the phase detecting amplifying unit 79 and hence decreases the displacement toward the right of the pilot valve piston 92 by decreasing the tendency of the armature 89 of the torque motor 90 to rock in a clockwise direction.

The shift to the right of the main control valve piston 102 as just above referred to connects the pressure side of the pump 108 through conduit 107 with conduit 106 between the lands 103 and 104 and conduit 106, as already explained, extends to the right hand side of the bore 28 in the contour slide 25 and between the piston 32 and the closed end of said bore. The other side of piston 32 in the bore 28 is connected by conduit 109 to the pressure side of the pump 108 through conduit 107 but since the effective area on the left hand side of the piston 32 is less than the effective area on the right hand side thereof the pressure fluid admitted by the conduit 106 to the right hand side of the piston will cause motion of the contour slide 25 to the right as viewed in Fig. 7. The velocity of the movement of the contour slide 25 to the right actuates the tachometer 122 and the latter generates a voltage a predetermined fraction of which appears between the lines 82 and 85. This voltage is of such polarity that it subtracts from the output of the phase detecting amplifying unit 79 and decreases the input to amplifying unit 78 and the input to torque motor 90 to reduce the displacement of pilot valve piston 92 toward the right. The action of the tachometer 122 is combination with the action of the sensing device 113 thus serves to maintain the main control valve piston 102 in a position such that the velocity of contour slide 25 is proportional to the displacement of follower 66 and the core 77 of the sensing device 63.

The motion of the contour slide 25 toward the right decreases the displacement toward the right of follower 66 with the result that the core 77 of the sensing device 63 approaches its neutral position. Consequently a slight decrease of the induced voltage appearing between lines 75 and 76 occurs during the motion of the contour slide and this allows the induced voltage from the sensing device 113 appearing between lines 81 and 75 to reverse the phase of the input to the amplifying unit 79. Consequently there occurs a reversal in the polarity of the output of the amplifying unit 79 which added to the output of tachometer 122 provides a reversal polarity input to the amplifying unit 78 thus reversing the current to the torque motor 90 and moving the armature 89 counterclockwise and the pilot valve piston 92 to the left as viewed in Fig. 7.

The left hand movement of the pilot valve piston 92 functions to place the chamber in the right hand end of the main control valve in communication with the pressure side of pump 95 to effect a left hand movement of the piston 102 of the main control valve toward neutral position a distance sufficient to slow down or stop the right hand motion of the control slide 25 so that it will be accurately correlated to the displacement of the follower 66.

When the follower 66 is displaced toward the left by the template 68 or by external forces, similar actions occur but in the opposite sense from those which have just been described to maintain the accurate and proper relationship between the amplitude of the displacements of follower 66 and the velocity of movement of contour slide 25.

Referring to Fig. 5, it will be assumed that the carriage 21 is in its feeding movement toward the left and that the follower 66 instead of the follower 57 shown in Fig. 5 is in starting position A. As the carriage moves toward the left and the follower is in contact with the straight line portion of the template 59 between position A and position C any external force such as cutting forces which may tend to displace the contour slide 25 relative to the cross slide 23 and template 68 will result in a displacement of follower 66 and thus cause a counteracting force to be set up in the cylinder bore 28. Consequently when the follower is engaging the straight line portion of the template between position A and position C the contour slide 25 is maintained in relative fixed relationship with respect to the cross slide 23. As the feeding of the carriage 21 toward the left continues and the follower engages the template between position C and position D the slope of the template effects displacement of the follower 66 sufficiently to cause the contour slide 25 to move at a velocity determined by the rate of longitudinal feeding movement of the carriage 21 and the slope of the template 68 between positions C and D. As the follower 66 moves along the template 68 between positions D and E the contour slide 25 is maintained in substantially fixed relationship relative to the cross slide 23 since this portion of the template is straight and parallel to the feeding movement of the carriage. The further feeding movement of the carriage causes the follower 66 to ride on the template from position E to position F which is a sloping portion of the template and the action is similar to but of opposite sense with the action which was described when the follower was engaging the template between positions C and D. The carriage 21 continues its feeding movement until the follower 66 has reached position B with respect to the template and it will be understood that during this continued movement the follower moving along the edge of the template will accurately control the relationship between the contour slide 25 and the cross slide 23 so that the contour slide will be stationary relative to the cross slide 23 or will move relative thereto depending on the configuration of the template. When the follower has reached position B on the template and the carriage has terminated its feeding movement the work piece 17 will have been machined to a contour corresponding to a contour determined by the contour of the template.

Although several embodiments of the invention have been illustrated and described it will be understood that the invention is susceptible of various modifications and adaptations within the scope of the appended claims.

Having thus described my invention, I claim:

1. An electrical pressure fluid control for pressure fluid motor that is adapted to move one movable member transversely to the path of movement of another movable member and comprising an operating pressure fluid circuit for the motor; an electrical sensing device adapted to be carried by the one movable member and including a movable follower adapted to be moved in a predetermined manner, a differential transformer the primary coil of which is connected to an A.C. electrical supply circuit and the core of which is shiftable by and in direct proportion to and in a direction determined by the movement of the said follower while the secondary coils of which are connected to an output circuit extending to a phase detecting amplifying device; a direct current amplifying device, an electrical circuit connection between the output side of said phase detecting amplifying device and the input side of said direct current amplifying device; a torque motor; an electrical circuit from the output side of said direct current amplifying device to the swingable core of said torque motor; a pilot valve having an endwise shiftable valve body connected to and operated by said core of said torque motor; an independent pressure fluid supply circuit to said pilot valve and of lower pressure than the operating pressure fluid circuit; a main control valve in said operating pressure fluid supply circuit and including an endwise shiftable valve body; pressure fluid connections between said pilot valve and said main control valve at the opposite ends of said shiftable valve body of the main control valve whereby operation of the pilot valve by said torque motor causes the low pressure fluid circuit to shift said main control valve to control the operating pressure fluid circuit and the pressure fluid motor and provide relative transverse movement between said movable members; a second differential transformer having its primary coil connected to said A.C. electrical supply circuit, its core connected to said endwise shiftable body of said main control valve, and its two secondary coils having their output circuit connected to the output circuit of the first mentioned differential transformer and provided with a potentiometer; a tachometer adapted to be operatively associated with the one movable member to be actuated thereby in direct proportion to its velocity relative to said other movable member and in accordance to the direction of movement thereof; and an electrical circuit connecting the output side of said tachometer with the electrical circuit connecting both of said amplifying devices and provided with a potentiometer.

2. An electrical pressure fluid control for a pressure fluid motor that is adapted to move one movable member transversely to the path of movement of another movable member and comprising an operating pressure fluid circuit for the motor; a first electrical sensing device including a movable follower adapted to be moved in a predetermined manner, said device being adapted to be carried by the one movable member and responsive to the movement of said follower for inducing signal voltages of a phase and value correlated to the direction and amplitude of movement of said follower; an output circuit from said electrical sensing device; amplifying mechanism connected to said output circuit; an output circuit from said amplifying mechanism; a main control valve in said operating pressure fluid circuit, an independent low pressure fluid circuit having means operatively associating the output circuit from said amplifying mechanism with said control valve to effect actuation of the latter; a second electrical sensing device operatively connected with said main control valve to be actuated thereby and having an output circuit connected to the output circuit of the said first electrical sensing device; a third electrical sensing device adapted to have an operative connection with the one movable member and to be actuated by the relative transverse movement of said movable members to produce a D.C. output voltage proportional to the velocity of movement of the one movable member; and an output circuit from said third electrical sensing device connected to said amplifying mechanism wherefore the sum of the voltages produced by said second and third electrical sensing devices acts on said amplifying mechanism to balance out in part the signal voltages from the first electrical sensing device and in correlation to the velocity of movement of the one movable member.

3. An electrical pressure fluid control means as defined in claim 2 and wherein a potentiometer is included in the output circuit from the said second electrical sensing device.

4. An electrical pressure fluid control means as defined in claim 2 and wherein the output circuit from the third electrical sensing device includes a potentiometer while said third electrical sensing device is a tachometer.

References Cited in the file of this patent

UNITED STATES PATENTS

| | | |
|---|---|---|
| 2,437,603 | Hornfeck | Mar. 9, 1948 |
| 2,457,558 | Hornfeck | Dec. 28, 1948 |
| 2,464,626 | Waterson | Mar. 15, 1949 |
| 2,473,572 | Cooper et al. | June 21, 1949 |
| 2,533,042 | Polson | Dec. 5, 1950 |
| 2,556,318 | Cooper | June 12, 1951 |
| 2,587,542 | Siekmann | Feb. 26, 1952 |
| 2,641,969 | Roehm | June 16, 1953 |
| 2,644,124 | Broadbent | June 30, 1953 |
| 2,655,940 | Jackson | Oct. 20, 1953 |
| 2,674,232 | Mason | Apr. 6, 1954 |
| 2,690,192 | Dannhardt | Sept. 28, 1954 |
| 2,722,198 | MacGeorge | Nov. 1, 1955 |